(12) United States Patent
Li et al.

(10) Patent No.: US 10,415,777 B2
(45) Date of Patent: Sep. 17, 2019

(54) LIGHTING APPARATUS AND METHOD OF MAKING THEREOF

(71) Applicant: GE Lighting Solutions, LLC, East Cleveland, OH (US)

(72) Inventors: Hui Li, Shanghai (CN); Jiping Zou, Shanghai (CN); Cuijuan Zhou, Shanghai (CN); Honglei Gao, Shanghai (CN); Bing Zhang, Shanghai (CN); Junqi Ren, Shanghai (CN)

(73) Assignee: Current Lighting Solutions, LLC, East Cleveland, OH (US)

( * ) Notice: Subject to any disclaimer, the term of this patent is extended or adjusted under 35 U.S.C. 154(b) by 0 days.

(21) Appl. No.: 15/668,162

(22) Filed: Aug. 3, 2017

(65) Prior Publication Data

US 2018/0038563 A1 Feb. 8, 2018

(30) Foreign Application Priority Data

Aug. 5, 2016 (CN) .......................... 2016 1 0638358

(51) Int. Cl.
*F21V 8/00* (2006.01)
*F21S 8/06* (2006.01)
(Continued)

(52) U.S. Cl.
CPC ................ *F21S 8/06* (2013.01); *E04B 9/006* (2013.01); *F21V 7/0008* (2013.01); *F21V 7/22* (2013.01);
(Continued)

(58) Field of Classification Search
CPC ..... F21S 8/06; G02B 6/00; F21V 7/22; F21V 21/02; F21V 15/01; F21V 7/0008;
(Continued)

(56) References Cited

U.S. PATENT DOCUMENTS 6,021,007 A * 2/2000 Murtha ................... F24J 2/062
359/613
7,905,651 B2 * 3/2011 Han ..................... G02B 5/0242
362/618
(Continued)

FOREIGN PATENT DOCUMENTS

JP 2006221922 A * 8/2006 ................ F21V 8/00

OTHER PUBLICATIONS

Full English Machine Translation of JP2006221922, Toda, Masatoshi, above. (Year: 2006).*

*Primary Examiner* — Donald L Raleigh
(74) *Attorney, Agent, or Firm* — Buckley, Maschoff & Talwalkar LLC

(57) ABSTRACT

A lighting apparatus and a method for manufacturing the same. A lighting apparatus is provided, including: a transparent portion including a first surface, a second surface and an edge connected to the first surface and the second surface, the edge including an inner surface with a preset shape; and a light source fixed on the transparent portion so that the inner surface receives light emitted by the light source and reflects it to at least one of the first surface and the second surface. The preset shape has a certain relationship with distribution of light emitted to the first surface and the second surface. The method for manufacturing just designs the preset shape during designing stage so as to satisfy requirements for distribution of the light emitted to the first surface and the second surface.

8 Claims, 6 Drawing Sheets

(51) Int. Cl.
*E04B 9/00* (2006.01)
*F21V 7/22* (2018.01)
*F21V 15/01* (2006.01)
*F21V 21/02* (2006.01)
*F21V 7/00* (2006.01)
*F21V 7/05* (2006.01)
*F21V 7/08* (2006.01)
*F21Y 115/10* (2016.01)

(52) U.S. Cl.
CPC .............. *F21V 15/01* (2013.01); *F21V 21/02* (2013.01); *F21V 7/05* (2013.01); *F21V 7/08* (2013.01); *F21Y 2115/10* (2016.08); *G02B 6/0055* (2013.01)

(58) Field of Classification Search
CPC ... F21V 7/08; F21V 7/05; E04B 9/006; F21Y 2115/10
See application file for complete search history.

(56) References Cited

U.S. PATENT DOCUMENTS

| | | |
|---|---|---|
| 8,794,812 B2 | 8/2014 | Coleman et al. |
| 2004/0246391 A1* | 12/2004 | Travis ................. G02B 27/0081 349/6 |
| 2006/0239006 A1* | 10/2006 | Chaves ................. G02B 6/0018 362/294 |
| 2007/0008457 A1* | 1/2007 | Takahashi ............ G02B 6/0018 349/64 |
| 2007/0188837 A1* | 8/2007 | Shimizu ................. G02B 5/203 359/13 |
| 2011/0176184 A1* | 7/2011 | Huang ............... H04N 1/02825 358/475 |
| 2014/0140094 A1* | 5/2014 | Miyao .................. G02B 6/0055 362/609 |
| 2016/0270183 A1* | 9/2016 | Wolfing ............. H05B 33/0869 |
| 2016/0334626 A1* | 11/2016 | Sugihara ............. G02B 27/0176 |
| 2017/0015436 A1* | 1/2017 | Schoen ................... G09F 13/10 |

* cited by examiner

LIGHTING APPARATUS AND METHOD OF MAKING THEREOF

FIELD OF THE INVENTION

Embodiments of the present invention relate to a lighting apparatus and a method for manufacturing the same, particularly to an LED lighting apparatus and a method for manufacturing the same.

BACKGROUND OF THE INVENTION

As the LED lighting technology is developing, LED lighting devices are becoming more and more widely used in people's lives, among which it is a general trend that LED bulbs, LED tubes and LED spot lights will replace the traditional bulbs, tubes and spot lights.

For the current LED light in the market, its designing principle basically utilizes lens to reflect light from a light source. When designing, the design needs to be performed for the lens according to the requirements. Although functions can be achieved, cost is also increased, and volume of the whole light is also increased, affecting its appearance.

Therefore, it is necessary to propose an LED lighting apparatus with simple structure that is manufactured at a low cost and whose spatial distribution of light may be customized according to requirements, and a method for manufacturing the same.

SUMMARY OF THE INVENTION

An objective of the embodiments of the present invention is to provide a lighting apparatus and a method for manufacturing the same.

According to a first aspect of embodiments of the present invention, a lighting apparatus is provided, comprising: a transparent portion comprising a first surface, a second surface and an edge connected to the first surface and the second surface, the edge comprising an inner surface with a preset shape; and a light source fixed on the transparent portion so that the inner surface receives light emitted by the light source and reflects it to at least one of the first surface and the second surface.

In an embodiment, the first surface is in parallel with the second surface.

In an embodiment, the preset shape of the inner surface comprises a cambered surface with a preset camber angle, the cambered surface having one side connected to the first surface and the other side connected to the second surface.

In an embodiment, the preset shape of the inner surface comprises at least one flat surface angled with the first surface or the second surface at a preset angle that is greater than 90° or less than 90°.

In an embodiment, the light source comprises an LED diode.

In an embodiment, the inner surface is coated with a light reflective coating.

In an embodiment, the at least one flat surface of the inner surface comprises a first reflective surface having one side connected to the first surface of the transparent portion and the other side connected to the second surface of the transparent portion.

In an embodiment, the at least one flat surface of the inner surface comprises a second reflective surface and a third reflective surface, the second reflective surface having one side connected to one side of the third reflective surface and having the other side connected to the first surface and angled with the first surface at a first preset angle, the other side of the third reflective surface being connected to the second surface and angled with the second surface at a second preset angle.

Another aspect of the present invention provides a method for manufacturing a lighting apparatus, comprising the following steps: providing a transparent portion comprising a first surface, a second surface and an edge connected with the first surface and the second surface; forming an inner surface of the edge, the inner surface having a preset shape; and providing a light source fixed on the transparent portion so that the inner surface receives light emitted by the light source and reflects it to at least one of the first surface and the second surface.

In an embodiment, "the inner surface having a preset shape" comprises: forming a cambered surface with a preset camber angle on the inner surface, the cambered surface having one side connected to the first surface and the other side connected to the second surface.

In an embodiment, "the inner surface having a preset shape" comprises: forming at least one flat surface on the inner surface, the at least one flat surface angled with the first surface or the second surface at a preset angle that is greater than 90° or less than 90°.

BRIEF DESCRIPTION OF THE DRAWINGS

Embodiments of the present invention can be better understood in light of description of one embodiment of the present invention with reference to the accompanying drawings, in which.

DETAILED DESCRIPTION OF THE INVENTION

Unless defined otherwise, the technical or scientific terms used herein should have the same meanings as commonly understood by one of ordinary skilled in the art to which the present invention belongs. The terms "first", "second" and the like in the Description and the Claims of the present application for invention do not mean any sequential order, number or importance, but are only used for distinguishing different components. Likewise, the terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The terms "coupled", "connected" and the like are not limited to being connected physically or mechanically, but may comprise electric connection, no matter directly or indirectly.

Figure 1:
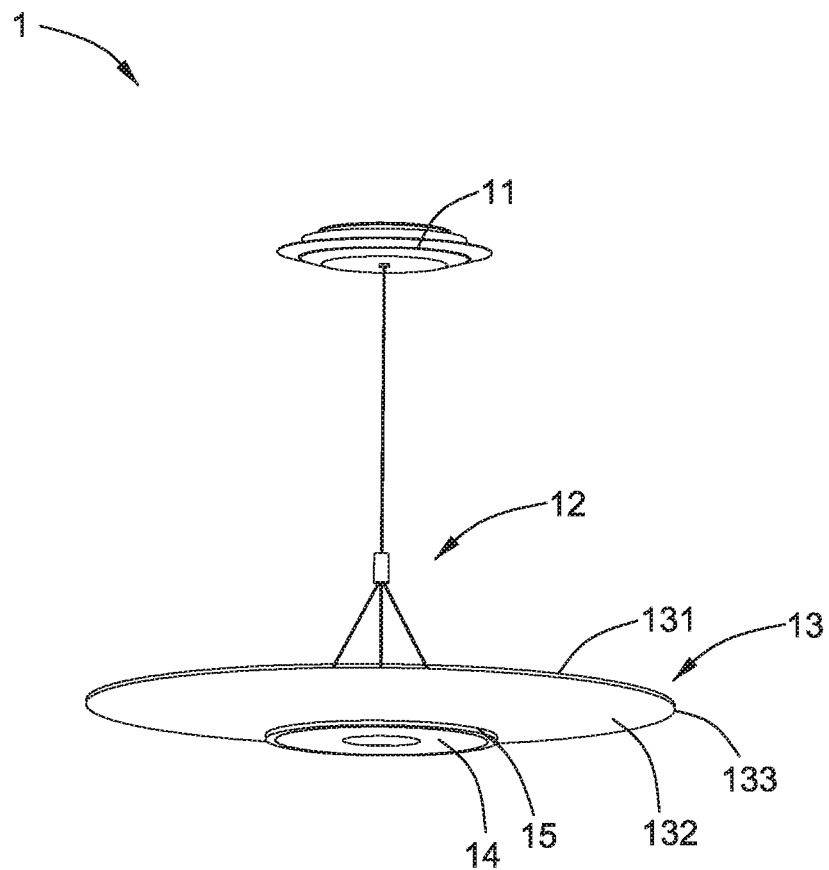
FIG. 1 illustrates a figure of effect for one embodiment of a lighting apparatus.

FIG. 1 illustrates a figure of effect for one embodiment of embodiments of the present invention. The lamp is a chandelier 1 having its driving power source 11 mounted on the ceiling and a hanging line 12 connected to the driving power source 11 and a heat sink 14. A transparent portion 13 comprises a first surface 131, a second surface 132 and an edge 133 connected with the first surface 131 and the second surface 132. The edge 133 comprises an inner surface. An LED light source 15 is mounted on the heat sink 14 that is fixed together with the transparent portion 13. The light emitted from the LED light source 15 is emitted to the edge 133 of the transparent portion 13 and emitted by the inner surface to the first surface 131 and the second surface 132, and then emitted to the outside. In this way, not only the space above the transparent portion 13 may be illuminated, but also the space below the transparent portion 13 may be illuminated.

Figure 2:
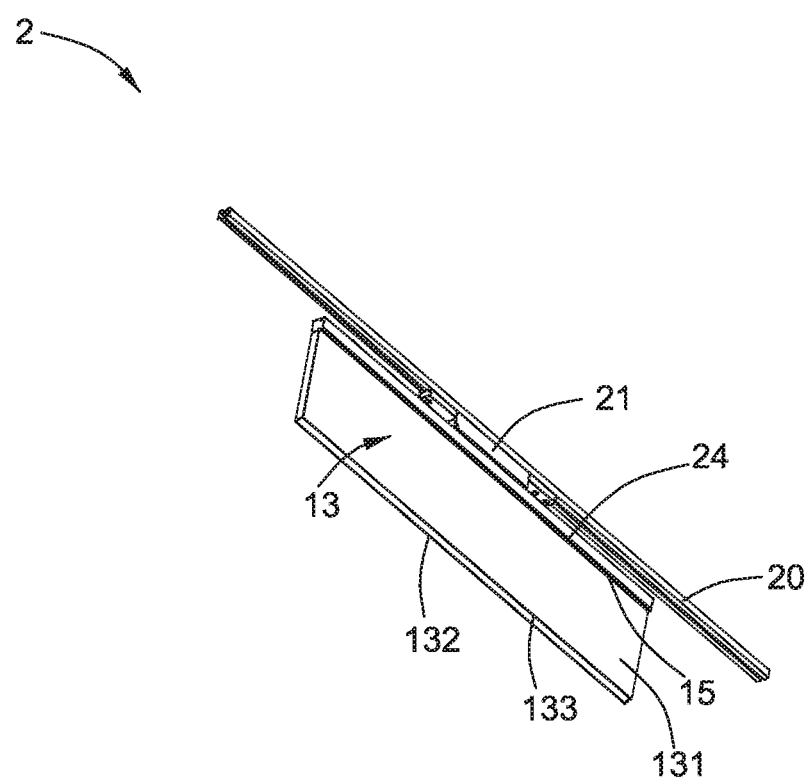
FIG. 2 illustrates a figure of effect for another embodiment of a lighting apparatus.

FIG. 2 illustrates a figure of effect for another embodiment of the present invention. The lamp is a plate light 2 with its upper portion being an installation slot 20. A driving power source 21 is fixed on the installation slot 20 via screws. A snap device 24 is fixed below the driving power source 21 for snapping the LED light source 15 and the transparent portion 13, thereby fixing the light source 15 and the transparent portion 13 together. The transparent portion 13 comprises a first surface 131, a second surface 132 and an edge 133 connected with the first surface 131 and the second surface 132. The edge 133 comprises an inner surface. The light emitted from the LED light source 15 is emitted to the edge 133 of the transparent portion 13 and reflected by the inner surface to the first surface 131 and the second surface 132, and then emitted to the outside. In this way, the space on two sides of the transparent portion 13 can be illuminated.

The illustrations of FIG. 1 and FIG. 2 are two typical scenes of application. In different situations of application, the clients have requirements for light distribution of different space. Therefore, when designing and manufacturing are being performed, a design may be customized and a corresponding transparent portion may be manufactured according to different requirements for light distribution, thereby producing lamps meeting the client's requirements for light distribution. FIG. 3 to FIG. 6 show different types of designs for transparent portions.

Figure 3:
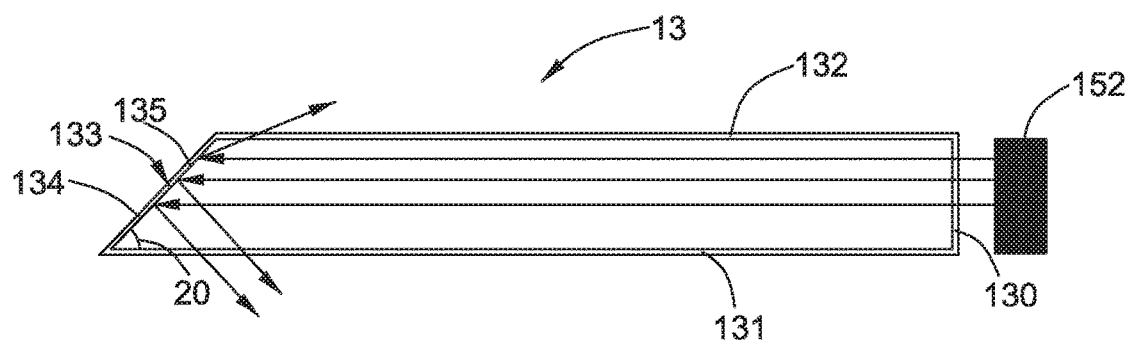
FIG. 3 illustrates a schematic sectional figure of a transparent portion of one embodiment of a lighting apparatus.

FIG. 3 shows a schematic sectional figure of a transparent portion of one embodiment of the present invention. As shown in FIG. 3, the transparent portion 13 is plate-shaped, having a first surface 131 in parallel with a second surface 132. In other embodiments, the first surface 131 is not necessarily in full parallel with the surface 132, as long as light can be transmitted. The first surface 131 and the second surface 132 are coated with astigmatic coatings, which can make the light emitted out of the space below and above the transparent portion 13 more uniform.

The inner surface 134 comprises a first reflective surface 135 having one side connected to the first surface 131 and the other side connected to the second surface 132. A light-emitting portion of the LED light emitting diode 152 faces the inner surface 134. The inner surface 134 is coated with a light reflective coating. In other embodiments, the part near the edge 133 of the transparent portion may be made of light reflective material so as to reflect the light emitted from the LED light emitting diode 152 as much as possible.

The preset angle 20 (which may also be formed by the inner surface 134 and the second surface 132) formed by the first reflective surface 135 and the first surface 131 is in direct relationship with the distribution of light emitted to the first surface 131 and emitted to the second surface 132. When the lamp is designed and manufactured, a corresponding preset angle may be designed and manufactured according to the client's requirement. The preset angle 20 may be greater than 90° or less than 90°, thus the client's requirement on light distribution can be satisfied. In the present embodiment, the preset angle 20 is designed to be 45°. The light emitted from the LED light emitting diode 152 is emitted onto the inner surface 134 of the transparent portion 13 and reflected by the first reflective surface 135, and then emitted onto the first surface 131 and the second surface 132. The upper and lower surfaces of the transparent portion 13 both have a certain range of light distribution. From a plurality of measurements, it can be seen that when the preset angle is 45°, the luminous flux of the upper and lower surfaces has a ratio range of 50% to 60%. When designing and manufacturing are specifically performed, pre-judgment is made according to the specific application and the preset angle may be adjusted.

Figure 4:
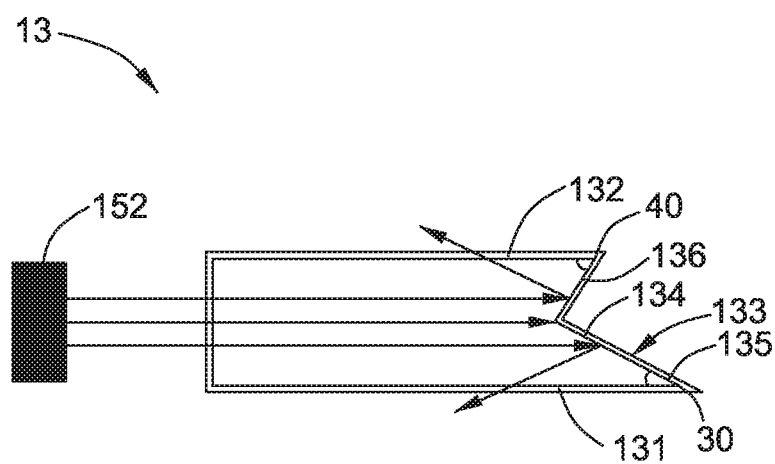
FIG. 4 illustrates a schematic sectional figure of a transparent portion of another embodiment of a lighting apparatus.

FIG. 4 is a schematic sectional figure of a transparent portion of another embodiment of the present invention. As shown in FIG. 4, the inner surface 134 comprises a first reflective surface 135 and a second reflective surface 136. One side of the first reflective surface 135 is connected with one side of the second reflective surface 136 to form a V shape depressing toward the direction of the light source 15. The other side of the first reflective surface 135 is connected to the first surface 131 to form a first preset angle 30, and the other side of the second reflective surface 136 is connected to the second surface 132 to form a second preset angle 40. The magnitude of the two preset angles may be adjusted according to the requirement, thus the ratio range of the luminous flux on the upper and lower surfaces may be changed. In the present embodiment, the first preset angle 30 is 30° and the second preset angle 40 is 60°. The light emitted from the LED light emitting diode 152 is reflected by the first reflective surface 135 and the second reflective surface 136, a part of which is emitted onto the first surface 131 and illuminates the space near the first surface 131 through the first surface 131, and the other part of which is emitted onto the second surface 132 and illuminates the space near the second surface 132 through the second surface 132.

Figure 5:
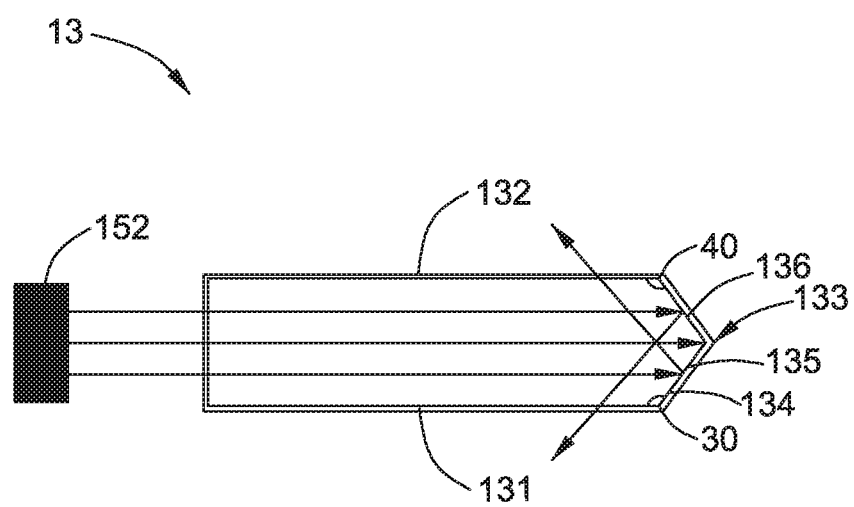
FIG. 5 illustrates a schematic sectional figure of a transparent portion of another embodiment of a lighting apparatus.

Similarly, the transparent portion 13 may also be designed in a shape as shown in FIG. 5. One side of the first reflective surface 135 and one side of the second reflective surface 136 form a V shape protruding outwardly. In the present embodiment, the first preset angle 30 and the second preset angle 40 have the identical angles, and the light distribution of the space near the first surface 131 is basically the same as that near the second surface 132.

Figure 6:
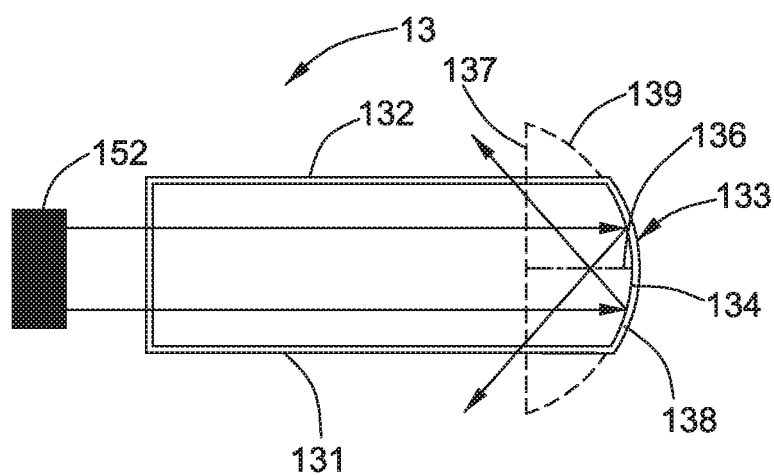
FIG. 6 illustrates a schematic sectional figure of a transparent portion of another embodiment of a lighting apparatus.

FIG. 6 is a schematic sectional figure of a transparent portion of another embodiment of the present invention. The transparent portion 13 is plate-shaped, having a first surface 131 in parallel with a second surface 132. The inner surface 134 comprises a cambered surface 138 having one side connected with the first surface 131 and the other side connected with the second surface 132. The cambered surface 138 is part of an ellipse, but only half of the ellipse 139 is drawn in FIG. 6. A long radius 137 and a short radius 136 of the ellipse 139 determine a camber angle of the cambered surface 138 that is a preset camber angle designed according to the experience. In the present embodiment, the long radius 137 of the ellipse is 5 mm and the short radius 136 of the ellipse is 2.5 mm. In other embodiments, lengths of the major axis and the minor axis may be set according to the requirement so as to control the preset camber angle, thus changing light distribution around the transparent portion 13.

Although for the designs of the transparent portions of FIG. 3 to FIG. 6, the present invention has been set forth in combination with specific embodiments, the person skilled in the art shall understand that many modifications and variations may be made to the present invention. Therefore, it should be recognized that the intention of the claims is to cover all these modifications and variations within the real concept and range of the present invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting apparatus, comprising:
    a transparent portion comprising a first surface, a second surface and an edge connected to the first surface and the second surface, the edge comprising an inner surface with a preset shape; and
    a light source fixed so that the inner surface receives light emitted by the light source through the transparent portion and reflects it to at least one of the first surface and the second surface;
    wherein the preset shape of the inner surface comprises:
        a V-shape wherein the inner surface comprises a first reflective surface and a second reflective surface and one side of the first reflective surface is connected with one side of the second reflective surface to form a V: shape, either depressing toward the direction of the light source or protruding outwardly from the direction of the light source.

2. The lighting apparatus as recited in claim 1, wherein the first surface of the transparent portion is in parallel with the second surface of the transparent portion.

3. The lighting apparatus as recited in claim 1, wherein the light source comprises an LED diode.

4. The lighting apparatus as recited in claim 1, wherein the inner surface is coated with a light reflective coating.

5. The lighting apparatus as recited in claim 1, wherein the preset shape of the inner surface comprises at least one flat surface, the at least one flat surface angled with the first surface or the second surface at a preset angle which that is greater than 90° or less than 90°;
    wherein the at least one flat surface of the inner surface comprises a first reflective surface, the first reflective surface having one side connected to the first surface of the transparent portion and having the other side connected to the second surface of the transparent portion.

6. The lighting apparatus as recited in claim 1, wherein the light source is fixed on the transparent portion.

7. A method for manufacturing a lighting apparatus, comprising the following steps:
    providing a transparent portion, the transparent portion comprising a first surface, a second surface and an edge connected with the first surface and the second surface;
    forming an inner surface of the edge, the inner surface having a preset shape; and
    providing a light source so that the inner surface receives light emitted by the light source through the transparent portion and reflects it to at least one of the first surface and the second surface;
    wherein the preset shape of the inner surface comprises:
        a V-shape wherein the inner surface comprises a first reflective surface and a second reflective surface and one side of the first reflective surface is connected with one side of the second reflective surface to form a V: shape, either depressing toward the direction of the light source or protruding outwardly from the direction of the light source.

8. The method for manufacturing a lighting apparatus as recited in claim 7, wherein the light source is fixed on the transparent portion.

* * * * *